(12) United States Patent
Shapiro et al.

(10) Patent No.: US 10,309,244 B2
(45) Date of Patent: Jun. 4, 2019

(54) CMC SHROUD SUPPORT SYSTEM

(71) Applicant: General Electric Company, Schenectady, NY (US)

(72) Inventors: Jason David Shapiro, Methuen, MA (US); Roger Lee Doughty, Pleasant Plain, OH (US); Michael John Franks, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 331 days.

(21) Appl. No.: 15/102,370

(22) PCT Filed: Dec. 4, 2014

(86) PCT No.: PCT/US2014/068490
§ 371 (c)(1),
(2) Date: Jun. 7, 2016

(87) PCT Pub. No.: WO2015/088869
PCT Pub. Date: Jun. 18, 2015

(65) Prior Publication Data
US 2016/0312639 A1 Oct. 27, 2016

Related U.S. Application Data

(60) Provisional application No. 61/915,114, filed on Dec. 12, 2013.

(51) Int. Cl.
*F01D 9/04* (2006.01)
*F02C 3/04* (2006.01)
(Continued)

(52) U.S. Cl.
CPC ............... *F01D 11/08* (2013.01); *F01D 9/04* (2013.01); *F01D 25/12* (2013.01); *F01D 25/24* (2013.01);
(Continued)

(58) Field of Classification Search
CPC . F01D 11/08; F01D 9/04; F01D 25/12; F01D 25/24; F01D 25/28; F01D 11/122;
(Continued)

(56) References Cited

U.S. PATENT DOCUMENTS 3,583,824 A   6/1971   Smuland et al.
3,778,185 A   12/1973  Plowman et al.
(Continued)

FOREIGN PATENT DOCUMENTS

CA   2520792 A1   3/2006
CN   1219215 A    6/1999
(Continued)

OTHER PUBLICATIONS

Michael John Franks et al., filed Dec. 15, 2011, U.S. Appl. No. 13/327,349.
(Continued)

*Primary Examiner* — Richard A Edgar
(74) *Attorney, Agent, or Firm* — General Electric Company; Kristi Davidson

(57) ABSTRACT

A shroud and shroud hanger are provided wherein at least the shroud is formed of ceramic matrix composite material. The shroud and hanger extend in a circumferential direction. A generally C-shaped clip extends radially to retain the hanger and shroud together.

12 Claims, 7 Drawing Sheets

(51) Int. Cl.
  *F01D 11/08* (2006.01)
  *F01D 11/12* (2006.01)
  *F01D 25/12* (2006.01)
  *F01D 25/24* (2006.01)
  *F01D 25/28* (2006.01)

(52) U.S. Cl.
  CPC .............. *F01D 25/28* (2013.01); *F02C 3/04* (2013.01); *F01D 11/122* (2013.01); *F05D 2220/32* (2013.01); *F05D 2300/603* (2013.01); *F05D 2300/6033* (2013.01); *Y02T 50/672* (2013.01)

(58) Field of Classification Search
  CPC .. F02C 3/04; F05D 2220/32; F05D 2300/603; F05D 2300/6033; Y02T 50/672
  USPC ........................................ 415/173.1
  See application file for complete search history.

(56) References Cited

U.S. PATENT DOCUMENTS

| | | |
|---|---|---|
| 4,087,199 A | 5/1978 | Hemsworth et al. |
| 4,460,311 A | 7/1984 | Trappmann et al. |
| 4,596,116 A | 6/1986 | Mandet et al. |
| 4,759,687 A | 7/1988 | Miraucourt et al. |
| 4,863,345 A | 9/1989 | Thompson et al. |
| 5,048,288 A | 9/1991 | Bessette et al. |
| 5,074,748 A | 12/1991 | Hagle |
| 5,080,557 A | 1/1992 | Berger |
| 5,127,793 A | 7/1992 | Walker et al. |
| 5,137,421 A | 8/1992 | Hayton |
| 5,154,577 A | 10/1992 | Kellock et al. |
| 5,169,287 A | 12/1992 | Proctor et al. |
| 5,188,507 A | 2/1993 | Sweeney |
| 5,197,853 A | 3/1993 | Creevy et al. |
| 5,593,277 A | 1/1997 | Proctor et al. |
| 5,655,876 A | 8/1997 | Rock et al. |
| 5,738,490 A | 4/1998 | Pizzi |
| 5,780,146 A | 7/1998 | Mason et al. |
| 5,964,575 A | 10/1999 | Marey |
| 6,113,349 A | 9/2000 | Bagepalli et al. |
| 6,164,656 A | 12/2000 | Frost |
| 6,290,459 B1 | 9/2001 | Correia |
| 6,315,519 B1 | 11/2001 | Bagepalli et al. |
| 6,340,285 B1 | 1/2002 | Gonyou et al. |
| 6,402,466 B1 | 6/2002 | Burdgick et al. |
| 6,412,149 B1 * | 7/2002 | Overberg .............. F01D 25/246 24/20 R |
| 6,503,051 B2 | 1/2003 | Predmore |
| 6,503,574 B1 | 1/2003 | Skelly et al. |
| 6,699,011 B2 | 3/2004 | Cot et al. |
| 6,702,550 B2 | 3/2004 | Darkins, Jr. et al. |
| 6,733,235 B2 | 5/2004 | Alford et al. |
| 6,808,363 B2 | 10/2004 | Darkins, Jr. et al. |
| 6,884,026 B2 | 4/2005 | Glynn et al. |
| 6,887,528 B2 | 5/2005 | Lau et al. |
| 6,893,214 B2 | 5/2005 | Alford et al. |
| 6,942,203 B2 | 9/2005 | Schroder et al. |
| 7,011,493 B2 | 3/2006 | Marchi et al. |
| 7,052,235 B2 | 5/2006 | Alford et al. |
| 7,217,089 B2 | 5/2007 | Durocher et al. |
| 7,238,002 B2 | 7/2007 | Cairo et al. |
| 7,270,518 B2 | 9/2007 | Barb et al. |
| 7,556,475 B2 | 7/2009 | Roberts, III et al. |
| 7,595,114 B2 | 9/2009 | Meschter et al. |
| 7,686,577 B2 | 3/2010 | Morrison et al. |
| 7,726,936 B2 | 6/2010 | Keller et al. |
| 7,749,565 B2 | 7/2010 | Johnson et al. |
| 7,753,643 B2 | 7/2010 | Gonzalez et al. |
| 7,819,625 B2 | 10/2010 | Merrill et al. |
| 7,871,244 B2 | 1/2011 | Marini et al. |
| 7,908,867 B2 | 3/2011 | Keller et al. |
| 7,950,234 B2 | 5/2011 | Radonovich et al. |
| 7,968,217 B2 | 6/2011 | Sarrafi-Nour et al. |
| 8,047,773 B2 | 11/2011 | Bruce et al. |
| 8,079,807 B2 | 12/2011 | Shapiro et al. |
| 8,118,546 B2 | 2/2012 | Morrison |
| 8,128,350 B2 | 3/2012 | Schiavo et al. |
| 8,167,546 B2 | 5/2012 | Shi et al. |
| 8,303,247 B2 | 11/2012 | Schlichting et al. |
| 8,328,505 B2 | 12/2012 | Shi et al. |
| 8,834,106 B2 | 9/2014 | Luczak |
| 2002/0127108 A1 | 9/2002 | Crall et al. |
| 2003/0031557 A1 | 2/2003 | Arilla et al. |
| 2003/0202876 A1 | 10/2003 | Jasklowski et al. |
| 2003/0215328 A1 | 11/2003 | McGrath et al. |
| 2004/0005216 A1 | 1/2004 | Suzumura et al. |
| 2004/0005452 A1 | 1/2004 | Dorfman et al. |
| 2004/0047726 A1 | 3/2004 | Morrison |
| 2004/0062640 A1 | 4/2004 | Darkins, Jr. et al. |
| 2004/0219011 A1 | 11/2004 | Albers et al. |
| 2005/0003172 A1 | 1/2005 | Wheeler et al. |
| 2005/0111965 A1 | 5/2005 | Lowe et al. |
| 2005/0129499 A1 | 6/2005 | Morris et al. |
| 2005/0141989 A1 | 6/2005 | Sayegh et al. |
| 2006/0078429 A1 | 4/2006 | Darkins, Jr. et al. |
| 2006/0083607 A1 | 4/2006 | Synnott et al. |
| 2006/0110247 A1 | 5/2006 | Nelson et al. |
| 2006/0110248 A1 | 5/2006 | Nelson et al. |
| 2006/0292001 A1 | 12/2006 | Keller et al. |
| 2007/0031245 A1 | 2/2007 | Ruthemeyer et al. |
| 2007/0031258 A1 | 2/2007 | Campbell et al. |
| 2007/0077141 A1 | 4/2007 | Keller |
| 2007/0154307 A1 | 7/2007 | Cairo |
| 2008/0025838 A1 | 1/2008 | Marini et al. |
| 2008/0206046 A1 * | 8/2008 | Razzell .............. F01D 11/005 415/173.1 |
| 2008/0206542 A1 | 8/2008 | Vance et al. |
| 2009/0010755 A1 | 1/2009 | Keller et al. |
| 2009/0053045 A1 | 2/2009 | Nowak et al. |
| 2009/0208322 A1 | 8/2009 | McCaffrey |
| 2009/0324393 A1 | 12/2009 | Gonzalez et al. |
| 2011/0085899 A1 | 4/2011 | Foster et al. |
| 2011/0182720 A1 | 7/2011 | Kojima et al. |
| 2011/0274538 A1 | 11/2011 | Shi et al. |
| 2011/0299976 A1 | 12/2011 | Uskert |
| 2011/0318171 A1 | 12/2011 | Albers et al. |
| 2012/0082540 A1 | 4/2012 | Dziech et al. |
| 2012/0107122 A1 | 5/2012 | Albers et al. |
| 2012/0156029 A1 | 6/2012 | Karafillis et al. |
| 2012/0171023 A1 | 7/2012 | Albers et al. |
| 2012/0171027 A1 | 7/2012 | Albers et al. |
| 2012/0247124 A1 | 10/2012 | Shapiro et al. |
| 2012/0260670 A1 | 10/2012 | Foster et al. |
| 2012/0263582 A1 | 10/2012 | Foster et al. |
| 2012/0275898 A1 | 11/2012 | McCaffrey et al. |
| 2013/0000324 A1 | 1/2013 | Alvanos et al. |
| 2013/0004306 A1 | 1/2013 | Albers et al. |
| 2013/0008176 A1 | 1/2013 | Shi et al. |
| 2013/0011248 A1 | 1/2013 | Croteau et al. |
| 2013/0017057 A1 | 1/2013 | Lagueux |
| 2013/0266435 A1 | 10/2013 | Foster et al. |
| 2014/0255170 A1 | 9/2014 | Hillier |
| 2014/0271144 A1 | 9/2014 | Landwehr et al. |
| 2014/0271145 A1 | 9/2014 | Thomas et al. |
| 2014/0294571 A1 | 10/2014 | Hillier |
| 2014/0294572 A1 | 10/2014 | Hillier et al. |
| 2014/0308113 A1 | 10/2014 | Westphal et al. |
| 2015/0016970 A1 | 1/2015 | Smith et al. |
| 2015/0377035 A1 | 12/2015 | Freeman et al. |

FOREIGN PATENT DOCUMENTS

| | | |
|---|---|---|
| CN | 1458393 A | 11/2003 |
| CN | 1542259 A | 11/2004 |
| CN | 101372902 A | 2/2009 |
| CN | 102135020 A | 7/2011 |
| EP | 0770761 A1 | 5/1997 |
| EP | 1225309 A1 | 7/2002 |
| EP | 1548144 A1 | 6/2005 |
| EP | 1801361 A1 | 6/2007 |
| EP | 1965030 A2 | 9/2008 |
| EP | 2631434 A2 | 8/2013 |

(56) References Cited

FOREIGN PATENT DOCUMENTS

| | | | |
|---|---|---|---|
| EP | 2774905 | A1 | 9/2014 |
| FR | 2540938 | A1 | 8/1984 |
| FR | 2580033 | A1 | 10/1986 |
| FR | 2942844 | A1 | 9/2010 |
| GB | 2397102 | A | 7/2004 |
| GB | 2480766 | A | 11/2011 |
| JP | 53065516 | A | 6/1978 |
| JP | 57010710 | A | 1/1982 |
| JP | 63239301 | A | 10/1988 |
| JP | 04330302 | A | 11/1992 |
| JP | 05141270 | A | 6/1993 |
| JP | 09013904 | A | 1/1997 |
| JP | 10103014 | A | 4/1998 |
| JP | 2002276301 | A | 9/2002 |
| JP | 2004036443 | A | 2/2004 |
| JP | 2005155626 | A | 6/2005 |
| JP | 2006105393 | A | 4/2006 |
| JP | 2007046603 | A | 2/2007 |
| JP | 2007182881 | A | 7/2007 |
| JP | 2011080468 | A | 4/2011 |
| JP | 2013170578 | A | 9/2013 |
| WO | 02099254 | A1 | 12/2002 |
| WO | 03026886 | A2 | 4/2003 |
| WO | 2013163505 | A1 | 10/2013 |
| WO | 2014130762 | A1 | 8/2014 |

OTHER PUBLICATIONS

Curtis Alan Johnson et al., filed Sep. 29, 2006, U.S. Appl. No. 11/537,278.
Michael John Franks et al., filed Feb. 22, 2012, U.S. Appl. No. 13/402,616.
Jonathan David Baldiga et al., filed Nov. 17, 2015, U.S. Appl. No. 14/891,806.
A PCT Search Report and Written Opinion issued in connection with related PCT Application No. PCT/US2014/035089 dated Jul. 1, 2014.
A Chinese Office Action issued in connection with related CN Application No. 201480028735.3 dated Sep. 5, 2016.
A Japanese Office Action issued in connection with related JP Application No. 2016513961 dated Nov. 8, 2016.
GE Related Case Form.
A U.S. Non-Final Office Action issued in connection with Related U.S. Appl. No. 14/634,060 dated May 17, 2017.
A Non-Final Office Action issued in connection with related U.S. Appl. No. 11/537,278 dated Jul. 9, 2009.
A Final Office Action issued in connection with related U.S. Appl. No. 11/537,278 dated Jan. 27, 2010.
A Non Final Office Action issued in connection with related U.S. Appl. No. 13/327,349 dated Jul. 22, 2014.
A Chinese Office Action issued in connection with corresponding CN Application No. 201210541477.1 dated May 12, 2015.
A Chinese Office Action issued in connection with corresponding CN Application No. 201310056712.0 dated Jun. 19, 2015.
A European Search Report and Opinion issued in connection with corresponding EP Application No. 12195953.0 dated Jul. 22, 2015.
Unofficial English Translation of Japanese Office Action issued in connection with corresponding JP Application No. 2012269895 dated Oct. 4, 2016.
Unofficial English Translation of Japanese Office Action issued in connection with corresponding JP Application No. 2013027200 dated Oct. 18, 2016.
Unofficial English Translation of Chinese Office Action issued in connection with corresponding CN Application No. 201480067368.8 dated Nov. 2, 2016.
Unofficial English Translation of Japanese Notice of Allowance issued in connection with corresponding JP Application No. 2013027200 dated Nov. 29, 2016.
A PCT Search Report and Written Opinion issued in connection with related PCT Application No. PCT/US2015/029236 dated Jul. 20, 2015.
A PCT Search Report and Written Opinion issued in connection with related PCT Application No. PCT/US2015/029342 dated Jul. 22, 2015.
A PCT Search Report and Written Opinion issued in connection with related PCT Application No. PCT/US2015/028050 dated Aug. 11, 2015.
A European Search Report and opinion issued in connection with related EP Application No. 16155655.0 dated Aug. 1, 2016.
A Chinese Office Action issued in connection with related CN Application No. 201610106090.1 dated Jan. 4, 2017.
A Canadian Office Action issued in connection with related CA Application No. 2921269 dated Jan. 25, 2017.
A Japanese Search Report issued in connection with related JP Application No. 2016029448 dated Jan. 25, 2017.
A Japanese Office Action issued in connection with related JP Application No. 2016029448 dated Feb. 7, 2017.
A Japanese Notice of Allowance issued in connection with related JP Application No. 2016513961 dated Feb. 21, 2017.
A PCT Search Report and Written Opinion issued in connection with corresponding PCT Application No. PCT/US2014/068490 dated Mar. 5, 2015.

\* cited by examiner

CMC SHROUD SUPPORT SYSTEM

CROSS REFERENCE TO RELATED APPLICATIONS

This non-provisional application is the National Stage of International Application No. PCT/US14/68490, filed Dec. 4, 2014 and claims the benefit of U.S. Provisional Application No. 61/915,114 filed Dec. 12, 2013, the whole disclosure of which is incorporated by reference herein.

BACKGROUND OF THE INVENTION

The disclosed embodiments generally pertain to shrouds for a gas turbine engine. More particularly, but not by way of limitation, present embodiments relate to ceramic matrix composite (CMC) shroud support systems utilized in gas turbine engines including a clip structure for connecting the CMC shroud.

A typical gas turbine engine generally possesses a forward end and an aft end with its several core or propulsion components positioned axially therebetween. An air inlet or intake is located at a forward end of the engine. Moving toward the aft end, in order, the intake is followed by a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A multi-stage high pressure turbine first receives the hot combustion gases from the combustor through a row of high pressure turbine rotor blades extending radially outwardly from a supporting rotor disk. A low pressure turbine may be disposed downstream of the high pressure turbine for further conversion of gas energy to mechanical energy.

A shroud assembly circumscribes the turbine rotor and defines an outer boundary for combustion gases flowing through the turbine. The turbine shroud may be a single unitary structure or may be formed of a plurality of segments. Some known shroud assemblies include a shroud hanger that is coupled to an outer casing of the engine to provide support to a plurality of shrouds positioned adjacent to, and radially outward of, the tips of the turbine blades.

Various structures have been suggested for mounting the shroud to the shroud hanger. Some current arrangements of shrouds and hangers have had only limited success for retaining the shroud in position. For example, some methods include mounting bolts extending between the shroud hanger and the shroud. However, this method may result in unacceptable bending load on the bolts.

Additionally, pressure loads on the shroud result in radial force pulling the shroud in a direction away from the hanger and toward the blades. When the shroud moves radially inwardly, the shroud may interfere with movement of the blade causing undue damage to blade tips. Therefore, some structure is needed to combat this force during engine operation.

Alternatively, when such radial motion is not limited properly in the opposite direction, radially outwardly, the shroud may move too far from adjacent blade tips allowing air leakage and decreasing efficiency.

As may be seen by the foregoing, it would be desirable to overcome these and other deficiencies with gas turbine engine components. Moreover, it would be desirable to limit relative radial movement between the shroud hanger and shroud.

SUMMARY OF THE INVENTION

According to instant embodiments, a shroud and shroud hanger are provided wherein at least the shroud is formed of ceramic matrix composite material. The shroud and hanger extend in a circumferential direction. A generally C-shaped clip extends radially to retain the hanger and shroud together.

According to some embodiments, a segmented shroud assembly comprises a shroud hanger which extends in a circumferential direction and has an axial dimension, a cavity disposed between an axial forward end and an axial rearward end and extending circumferentially, a ceramic matrix composite (CMC) shroud disposed within the cavity, the CMC shroud having a lower wall, at least one side wall, at least one upper wall and at least a partially hollow interior, a c-clip connecting the shroud hanger and the CMC shroud, the c-clip disposed at an end of the shroud hanger and engaging a lower surface of the upper wall.

Optionally, the clip may have an upper rib and a lower rib for engaging the shroud hanger and the CMC shroud. The segmented shroud assembly may further comprise a baffle positioned within the at least partially hollow interior. The segmented shroud assembly wherein the c-clip extends into a recess in the shroud hanger. The recess may be formed to allow the c-clip to fit flush with a slash face of the shroud hanger. The CMC shroud may have an opening in the upper wall. The opening may be centered between a first upper wall and a second upper wall. The CMC shroud may further comprise a second opening at an end of the shroud. The shroud may further comprise a support depending from one of the first upper wall and the second upper wall. The segmented shroud assembly wherein one of the first and second upper wall are disposed at an end of the CMC shroud. The segmented shroud assembly wherein the other of the first and second upper wall are disposed near an end of the CMC shroud. The segmented shroud assembly wherein the support has a width in a circumferential dimension which is greater than a width of the one of the first upper wall and the second upper wall. The segmented shroud assembly wherein the opening is disposed at a circumferential end of the upper wall. The shroud may have a spacer disposed on the at least one upper wall. The segmented shroud assembly wherein the c-clip limits motion of the shroud in a radial direction. The segmented shroud assembly wherein the c-clip is disposed at one of at least one end of the shroud or intermediate to ends of the shroud.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of these exemplary embodiments, and the manner of attaining them, will become more apparent and the C-clip supported segmented shroud will be better understood by reference to the following description of embodiments taken in conjunction with the accompanying drawings, wherein.

DETAILED DESCRIPTION OF THE INVENTION

Figure 1:
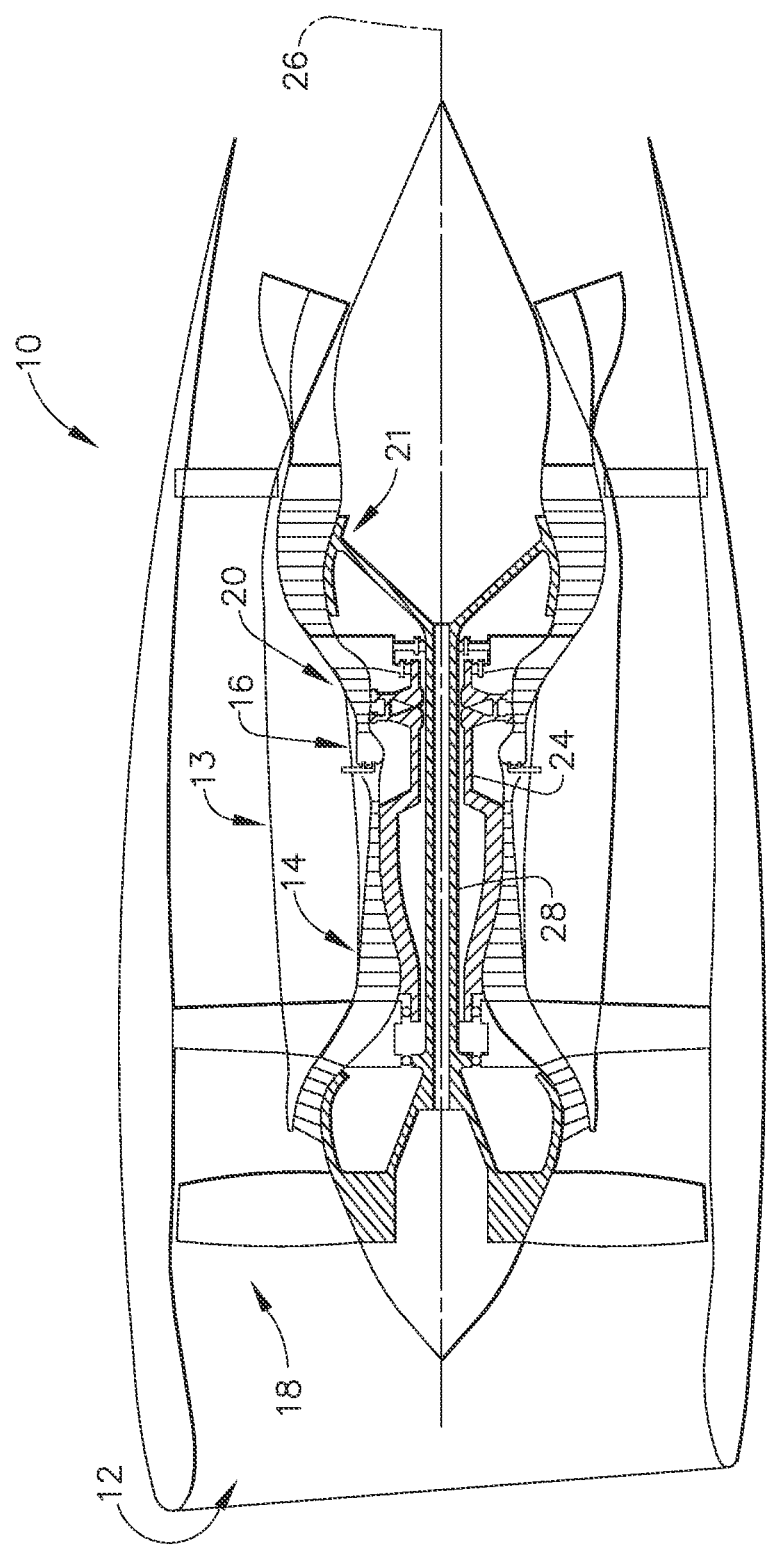
FIG. 1 is a side section view of an exemplary embodiment of a gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-9 various embodiments of a C-clip supported Ceramic Matrix Composite ("CMC") shroud support system is depicted. The shroud and shroud hanger are connected by a C-clip to limit relative radial motion between the two components. The shroud may have various forms in order to function with the shroud hanger. The shroud hanger system may be utilized in various portions of the gas turbine engine including, but not limited to, high pressure and low pressure turbines as well as the compressor. All of these features improve any or all of manufacture, operation or performance.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Referring initially to FIG. 1, a schematic side section view of a gas turbine engine 10 is shown. The function of the turbine is to extract energy from high pressure and temperature combustion gases and convert the energy to mechanical energy for work. The turbine 10 has an engine inlet end 12 wherein air enters the core or propulsor 13 which is defined generally by a multi-stage high pressure compressor 14, a combustor 16 and a multi-stage high pressure turbine 20. Collectively, the propulsor 13 provides thrust or power during operation. The gas turbine 10 may be used for aviation, power generation, industrial, marine or the like.

In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 and enters the high pressure turbine 20. At the high pressure turbine 20, energy is extracted from the hot combustion gas causing rotation of turbine blades which, in turn, cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. The low pressure turbine 21 may also be utilized to extract further energy and power additional compressor stages. The low pressure air may be used to aid in cooling components of the engine as well.

Figure 2:
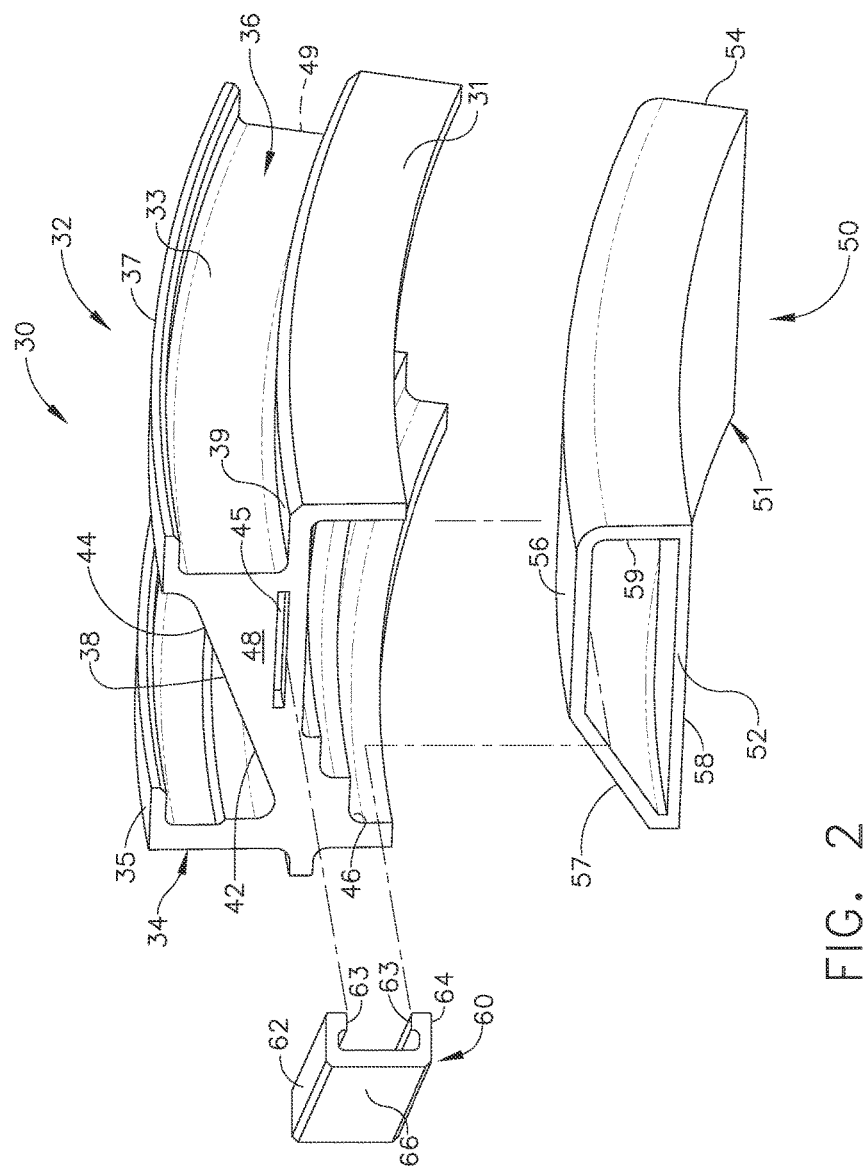
FIG. 2 is an exploded assembly view of a C-clip supported shroud.

Referring now to FIG. 2, an exploded assembly view of a C-clip supported shroud assembly 30 is depicted. The assembly 30 includes a hanger 32, a shroud 50 comprised of a plurality of shroud segments 51 and a retainer or c-clip 60. A baffle 80 (FIG. 4) may optionally be used within the shroud segment 51. The baffle 80 may be disposed within the shroud 50 and may include apertures (not shown) to provide shroud cooling air from a known source through the baffle 80 to the shroud 50. The baffle may take various forms which fit within the shroud 50 and which provide backside impingement cooling to the shroud segment 51.

A shroud hanger 32 which is connected to the engine casing and extends circumferentially about a portion of the engine, for example the turbine. The engine casing extends circumferentially about the engine axis 26 (FIG. 1). Hangers 32 extend from the radially inward surface of the engine casing. One or more hangers 32 may extend circumferentially about the engine casing corresponding to the circumferential shape of the turbine 20. The hangers 32 retain the one or more shroud segments 50 in circular configuration about the engine axis 26 (FIG. 1) and the shroud segments 50 define the flow boundary within portions of the engine, for non-limiting example the compressor 14 or turbine 20.

The shroud hanger 32 is defined by a plurality of segments which in combination, extend about the central axis 26 of the engine. The shroud hanger 32 may include a first wall 34 a second wall 36, each of which extend in a radial direction and in a circumferential direction. The first wall 34 may be a one-piece linear structure and may extend in a substantially radial direction when mounted in the engine 10. Alternatively, the first wall 34 may be formed of a plurality of segments, linear, curvilinear or a combination of both. The second wall 36 may also be linear or may be formed of segments. The second wall 36, for example, may have two radially extending segments 31 and 33 and an axially extending 39 portion between the radially extending segments.

A hanger gusset 38 may extend between the first wall 34 and the second wall 36 and may extend axially or may extend at an angle to the central axis 26 as depicted. According to instant embodiment, the gusset 38 is tapered from a lower radial height 42 at the first wall 34 to a higher radial height 44 at the second wall 36. The gusset 38 may alternatively be flat or tapered in the opposite direction.

The shroud hanger 32 includes tabs or hooks 35, 37 which may be utilized to engage the engine casing. The tabs 35, 37 may extend continuously in a circumferential direction or may be defined by tabs at specific locations where connections occur to save weight. These hooks 35, 37 may take various forms in order to provide a mounting assembly or structure. For example, the depicted embodiment has a generally inverted L-shaped cross-section in combination with the first and second walls 34, 36. However, this is merely one exemplary embodiment and others may be utilized.

As depicted, the first and second walls 34, 36 and the gusset 38 of shroud hanger 32 form a cavity 46 wherein the shroud 50 may be positioned. The shroud 50 may be formed of one or more shroud segments 51. The lower most surface of the shroud segment 51 defines an outer surface of an air flow path within the gas turbine engine 10, for example a compressor 14 or turbine 20. The segments 51 may further comprise an abradable material on the lowermost surface 58. Radially inward from the shroud segment 51 may be an airfoil blade 23 which rotates during operation of the gas turbine engine 10 with a rotor disk. The assembly 30 includes a shroud hanger 32 and a side section view of exemplary shroud support system 30 is depicted.

An exemplary turbine is shown, however the instant embodiments are not limited to turbine use. The turbine 20 includes a row of circumferentially spaced stationary vanes (not shown) and a plurality of circumferentially spaced turbine blades (not shown) downstream of the vanes. The blades are foil-shaped and mounted to a turbine rotor disk (not shown). Each of the blades 23 extends radially toward a shroud 50. The shroud 50 extends circumferentially about the engine axis 26 and is comprised of a plurality of shroud segments 51. Optionally, the shroud 50 may be formed of one unitary structure. The shroud 50 is tightly configured relative to the blades 23 so that the shroud 50 defines an outer radial flowpath boundary for the hot combustion gas flowing through the turbine 20.

A ceramic matrix composite (CMC) shroud 50 is positioned within the cavity 46 of the shroud hanger 32. The shroud 50 defines a structure which is disposed against the rotor blade tips of, for example, the turbine 20. The shroud 50 may be positioned within the cavity 46 and is sized and shaped to be positioned within the cavity 46.

The shroud segments 50 include end faces 52 which are commonly referred to as "slash faces." The slash faces 52, 54 may lie in plane parallel to the center line axis of the engine 10, referred to as a "radial plane", or they may be slightly offset from the radial plane, or otherwise oriented so that they are at an acute angle to such radial plane. Each shroud 50 includes a top wall 56, a bottom wall 58 and at least one side wall 59. The instant embodiment includes a second side wall or transition wall 57 opposite the first side wall 59 which extends substantially between the top wall 56 and the bottom wall 58.

Within the top surface 56 of the shroud 50 may or may not include one or more windows or relief sections (not shown), which in combination with adjacent relief sections of adjacent segments 50 form apertures. The windows may be fully bounded within the top surface of the shroud 50. The second window may also be fully bounded within the top surface of the shroud 50 or alternatively may be disposed at circumferential ends of the shroud 50, at a slash face 52, 54, so that adjacent shrouds 50 form a complete window. For example, when a plurality of segments 51 are positioned to form a complete circular arrangement, the shroud 50 has a plurality of circumferentially spaced apertures formed by adjacent relief windows located in the top wall 56. In either of these embodiments, the shroud 50 may be supported from the hanger 32 at these locations or at ends of the shroud segment 51.

Additionally, when the hangers 32 and shrouds 50 are assembled into a complete ring, end gaps may be positioned in the slash faces 52, 54 and 48, 49. These gaps may be used to position one or more spline seals. These spline seals may be formed of thin strips of metal or other suitable materials which are inserted in slots or gaps at the end faces to span the gaps between adjacent segments and limit air leakage between the hangers 32 and the shrouds 50.

The shroud segments 50 may be constructed of various low ductility and low coefficient of thermal expansion materials including but not limited to a ceramic matrix composite (CMC). Generally, CMC materials include a ceramic fiber, for example a silicon carbide (SiC), forms of which are coated with a compliant material such as boron nitride (BN). The fibers are coated in a ceramic type matrix, one form of which is silicon carbide (SiC). Typically, the shroud segment 40 can also be constructed of other low-ductility, high-temperature-capable materials. CMC materials generally have room temperature tensile ductility of less than or equal to about 1% which is used herein to define a low tensile ductility material. Generally, CMC materials have a room temperature tensile ductility in the range of about 0.4% to about 0.7%.

CMC materials have a characteristic wherein the materials tensile strength in the direction parallel to the length of the fibers (the "fiber direction") is stronger than the tensile strength in the direction perpendicular. This perpendicular direction may include matrix, interlaminar, secondary or tertiary fiber directions. Various physical properties may also differ between the fiber and the matrix directions.

Additionally, at the slash faces 48, 52, a C-clip 60 is positioned for use. The clip includes a first leg 62, a second leg 64 and third leg 66 extending between the first leg 62 and second leg 64. The first leg 62 of the C-clip 60 engages a recess 45 in the slash face 48 of the hanger 32. Additionally, the second leg 64 of the C-clip 60 engages a lower surface of the upper wall 56. The C-clip 60 is forced in a circumferential direction so that the third leg 66 engages the slash faces 48, 52. A similar construction is utilized on the opposite end of the shroud hanger 32 and the shroud 50.

Figure 3:
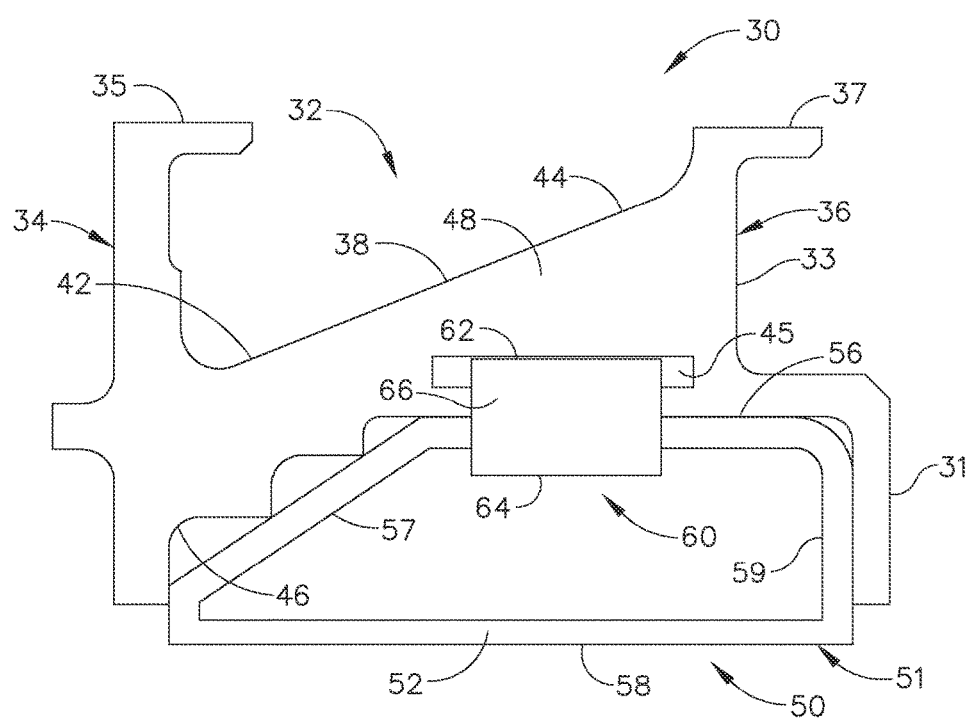
FIG. 3 is an assembled view of the embodiment of FIG. 2.

Referring now to FIG. 3, an assembled view of the shroud assembly 30 is depicted. The C-clip 60 is positioned within the recess 45 and beneath the upper wall 56 of the shroud 50. The C-clip 60 retains the shroud hanger 32 and the shroud 50 together in the radial direction and limits relative radial motion between the two parts.

The C-clip 60 may be utilized at ends of the shroud hanger 32. However, due to the arrangements of the shroud segments 51, the C-clips 60 may be engaging the segments at various locations including either of the slash faces 52, 54 or through openings in the top wall 56 of the shroud 50. The C-clips 60 include the first leg 62 and the second leg 64 which extend in a generally tangential or circumferential direction. The third leg 66 extends radially between the first and second legs 62, 64. The C-clips 60 may be friction fit to engage the shroud hanger 32 and the shroud 50.

The upper surface 56 of the shroud engages a cavity surface of the hanger 32. Additionally, the transition surface 57 may be engages by edges or a surface of the hanger 32 for additional stability. Ends of the shroud 50 may also engage portions of the hanger 32 for added stability.

Figure 4:
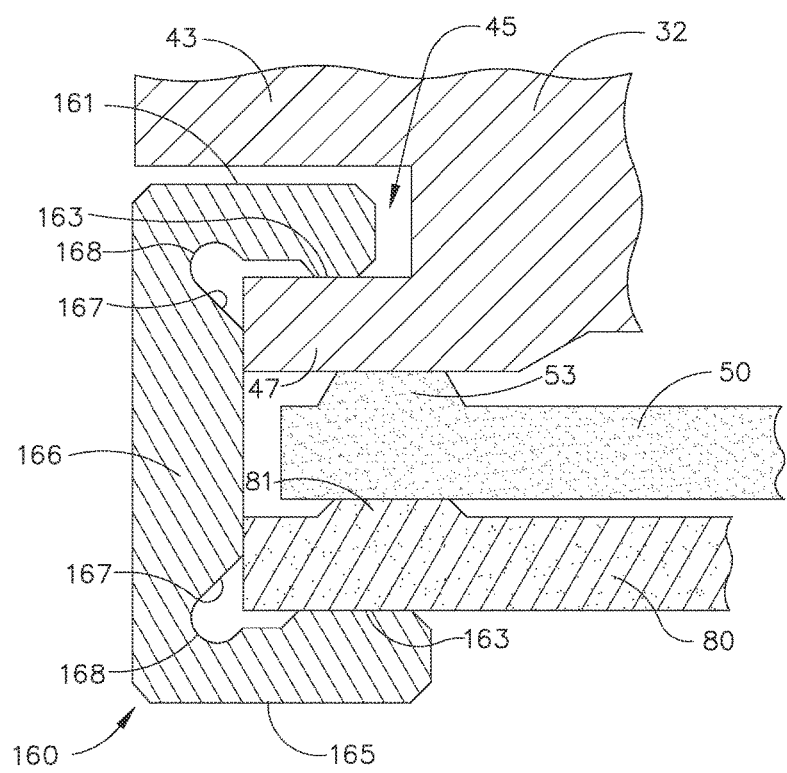
FIG. 4 is an alternative embodiment of a C-clip supported shroud including a baffle.

Referring now to FIG. 4, a side section view of an alternate embodiment is depicted. The C-clip 160 is shown engaging the shroud hanger 32. The side section view of the hanger 32 depicts the recess 45 and the C-clip 160 extending into the recess 45. Additionally, the lower or second leg 165 extends in a circumferential direction to capture the shroud 50 and, optionally, a baffle 80. The baffle 80 may be utilized to direct cooling air to the interior of the shroud 50. As shown in the embodiment, the C-clip or retainer 160 may be flush with the slash faces of the shroud or hanger which allows for sealing between the segments. The flush fit may be provided in a variety of manners and according to one exemplary embodiment, the recess 45 is defined by two recess walls 43, 47. The lower wall 47 is shorter in length in the circumferential direction so that when positioned in the retaining position, the outer surface of the c-clip 160 is substantially flush with the slash face of the hanger 32. This allows flush fit of adjacent hangers 32 in the circumferential direction.

Additionally, in comparing FIGS. 2 and 3 to FIG. 4, the C-clips differ slightly. According to the embodiment of FIGS. 2 and 3, the third leg 66 of the C-clip 60 is linear in nature and of a constant thickness. However, as shown in FIG. 4, the third leg 166 has tapered portions 167 causing the thickness of the third leg 166 to vary in thickness providing proper spacing of the C-clip 160 in the circumferential direction. Further, internal corners of the clip 160 may also have reliefs 168 to allow stress relief during flexing and thermal growth.

Additionally, the first and second legs 161, 165 may include ribs or protrusions 163 of a different thickness so as to engage the hanger 32, shroud 50 and optionally, baffle 80 with the appropriate fit and provide additional strength to the C-clips 60, 160.

The cross-sectional view of FIG. 4 also depicts spacing structures utilized with the shroud 50 and the baffle 80. The shroud 50 includes a spacing rib 53 extending in a radial direction to provide spacing between the hanger 32 and the shroud 50. The rib 51 may be continuous in the circumferential direction or may be discontinuous in the circumferential direction. Similarly, the baffle 80 may include a spacing rib 81 which extends radially from the baffle toward the shroud 50. The ribs 51, 81 are depicted in some embodiments extending from upper surfaces of the shroud 50 and the baffle 80. However, in alternate embodiments, the ribs may extend from alternate surfaces or may extend from the hanger 32 in order to provide proper spacing.

Figure 5:
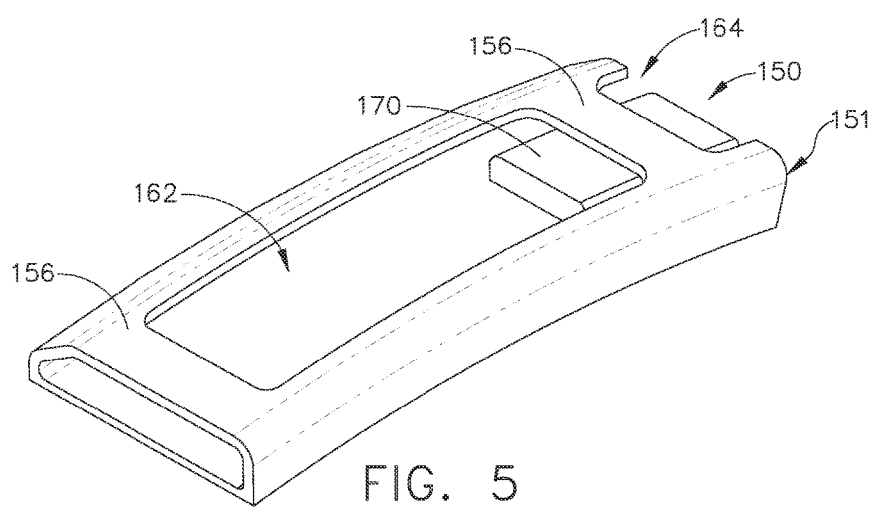
FIG. 5 is a first embodiment of a shroud for use with the C-clip support assembly.

Referring now to FIG. 5, a portion of a shroud embodiment 150 is depicted. The shroud segment 151 is generally shaped similarly to the embodiment of FIGS. 2 and 3. Additionally, the embodiment includes windows or relief areas 162, 164 as previously described. These windows provide weight reduction for the shroud 150. The window 162 is completely enclosed in the top wall 156. Alternatively, the window 164 is partially disposed within the top wall 156 so that upon mating with an adjacent shroud segment 151, the second window or relief 164 will be fully formed. According to some embodiments, the shroud segment 151 may fully enclose two or more windows depending on the circumferential length of the segment.

Beneath the top wall 156 is a center support 170. The center support 170 may be oblong in cross-section according to one embodiment however, various cross-sectional shapes may be utilized. The "center support" 170 provides additional strength for the support or top wall 156 in the center of the shroud segment 151. The center support 170 may also be used to hang the shroud 150 from a hanger, for example hanger 32. The term center is used because the embodiment depicted is a partial shroud segment 151 and the segment support 170 is located at the center of the embodiment of segment 151. Although the segment shows a window 164 partially formed, embodiments, may be provided wherein the segment is longer or shorter than depicted in this and other embodiments of this disclosure. As previously indicated, the shroud 150 may be formed of one or more shroud segments.

Figure 6:
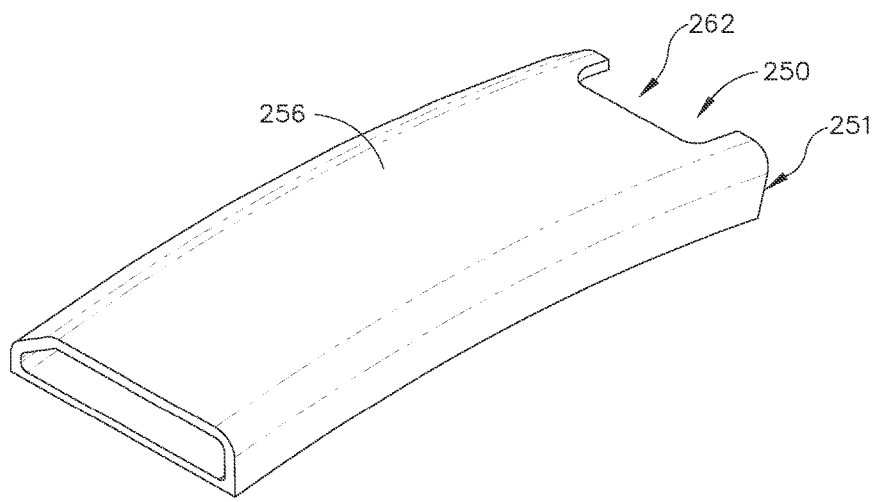
FIG. 6 is a second embodiment of a shroud for use with the C-clip support assembly.

Referring now to FIG. 6, an isometric view of an alternate shroud 250. Again, the shroud depicted is a segment of a portion of a complete segment 251. The structure has a single window 262 rather than two windows in the top wall 256 of the segment. The single window is depicted at an end of the segment 251. However, the segment 251 may be longer wherein the window 262 is centrally located or alternatively positioned and either fully enclosed or partially enclosed.

Figure 7:
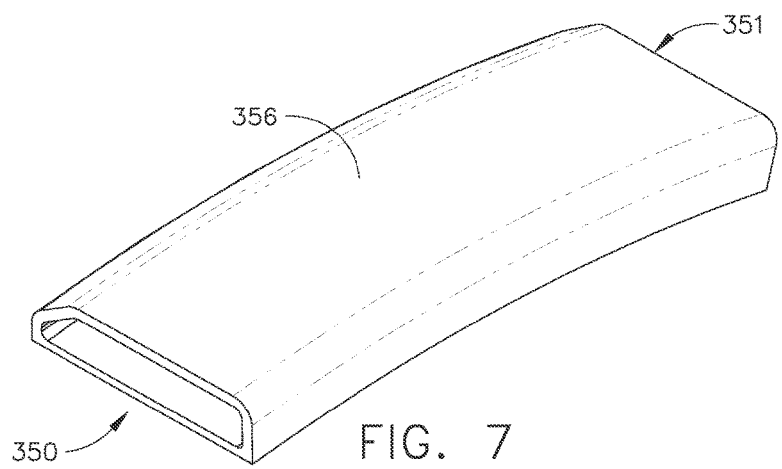
FIG. 7 is a third embodiment of a shroud for use with the C-clip support assembly.

Referring now to FIG. 7, a further alternate embodiment of a shroud 350 is depicted. According to this embodiment, the shroud top wall 356 is solid and therefore, does not have any of the weight reducing relief or windows of the previous embodiments. Additionally, the shroud segment 351 is hollow. While the shrouds are depicted as hollow, they may alternatively be partially hollow for improved strength or other desirable characteristics.

Figure 8:
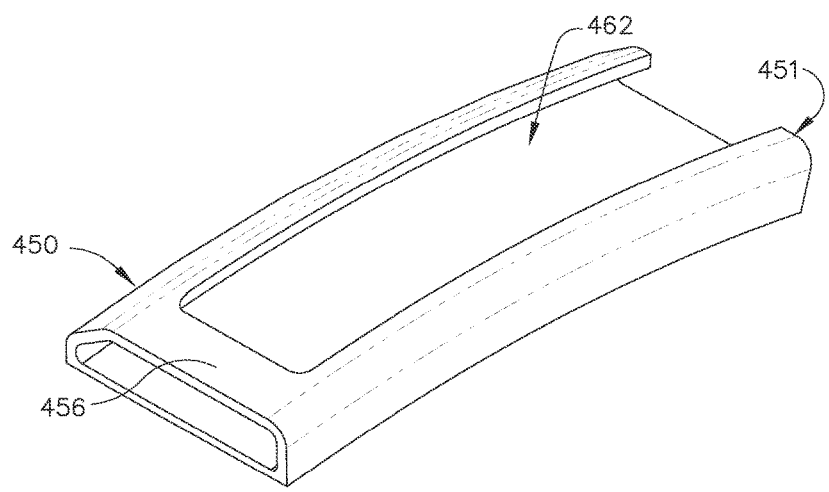
FIG. 8 is a fourth embodiment of a shroud for use with the C-clip support assembly; and, FIG. 9 is a fifth embodiment of a shroud for use with the C-clip support assembly.

Referring to FIG. 8, a further embodiment is depicted of an alternate shroud 450. This embodiment includes top wall 456 only at ends of the shroud segment 451. Again, this embodiment shows half of a single segment and accordingly, the window or relief 462 extends almost the entire circumferential distance of the top wall 456.

Figure 9:
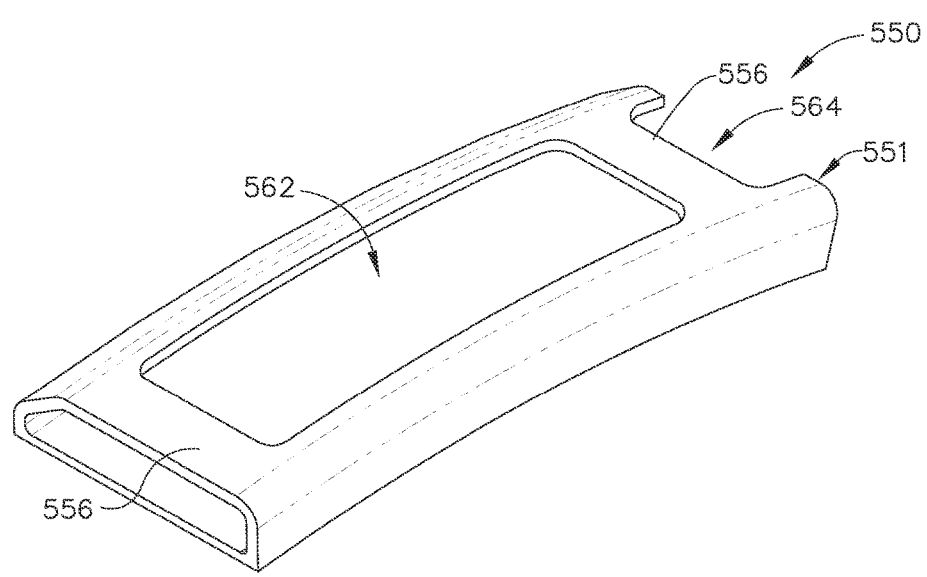

The embodiment of FIG. 9 depicts a further alternative wherein the shroud 550 is shown in part. The structure includes two windows 562, 564 for weight relief and a support 556 extending there between and defining part of the top wall of the shroud 550. The structure however, does not include a center support as with the embodiment of FIG. 5.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A segmented shroud assembly, comprising:
   a shroud hanger which extends in a circumferential direction between first and second slash faces and has an axial dimension, a cavity disposed between an axially forward end and an axially rearward end and extending circumferentially, at least one of the first and second slash faces having a recess defined therein;
   a ceramic matrix composite (CMC) shroud disposed within said cavity;
   said CMC shroud having a lower wall, at least one side wall, at least one upper wall and at least a partially hollow interior; and,
   a c-clip connecting said shroud hanger and said CMC shroud;
   said c-clip disposed at an end of said shroud hanger and engaging the recess and a lower surface of said upper wall.

2. The segmented shroud assembly of claim 1, said c-clip having an upper rib for engaging the recess of said shroud hanger and a lower rib for engaging said CMC shroud.

3. The segmented shroud assembly of claim 1 further comprising a baffle positioned within said at least partially hollow interior.

4. The segmented shroud assembly of claim 1, said recess formed to allow said c-clip to fit flush with a slash face of said shroud hanger.

5. The segmented shroud assembly of claim 1, said CMC shroud having an opening in said upper wall.

6. The segmented shroud assembly of claim 5, said opening being centered in the upper wall of the CMC shroud, thereby creating spaced-apart first and second upper wall sections, the first upper wall section being disposed adjacent a first end of the CMC shroud and the second upper wall section being disposed adjacent to a second end of the CMC shroud.

7. The segmented shroud assembly of claim 6 further comprising a second opening in the upper wall, the second opening being disposed adjacent to at least one of the first and second ends of said shroud.

8. The segmented shroud assembly of claim 7 further comprising a support depending from one of said first upper wall section and said second upper wall section.

9. The segmented shroud assembly of claim 8, said support having a width in a circumferential dimension which is greater than a width of said one of said first upper wall section and said second upper wall section.

10. The segmented shroud assembly of claim 5 further comprising said opening being at a circumferential end of said upper wall.

11. The segmented shroud assembly of claim 1, said shroud having a spacer disposed on said at least one upper wall.

12. The segmented shroud assembly of claim 1, said c-clip limiting motion of said shroud in a radial direction.

* * * * *